United States Patent Office 2,936,157
Patented May 10, 1960

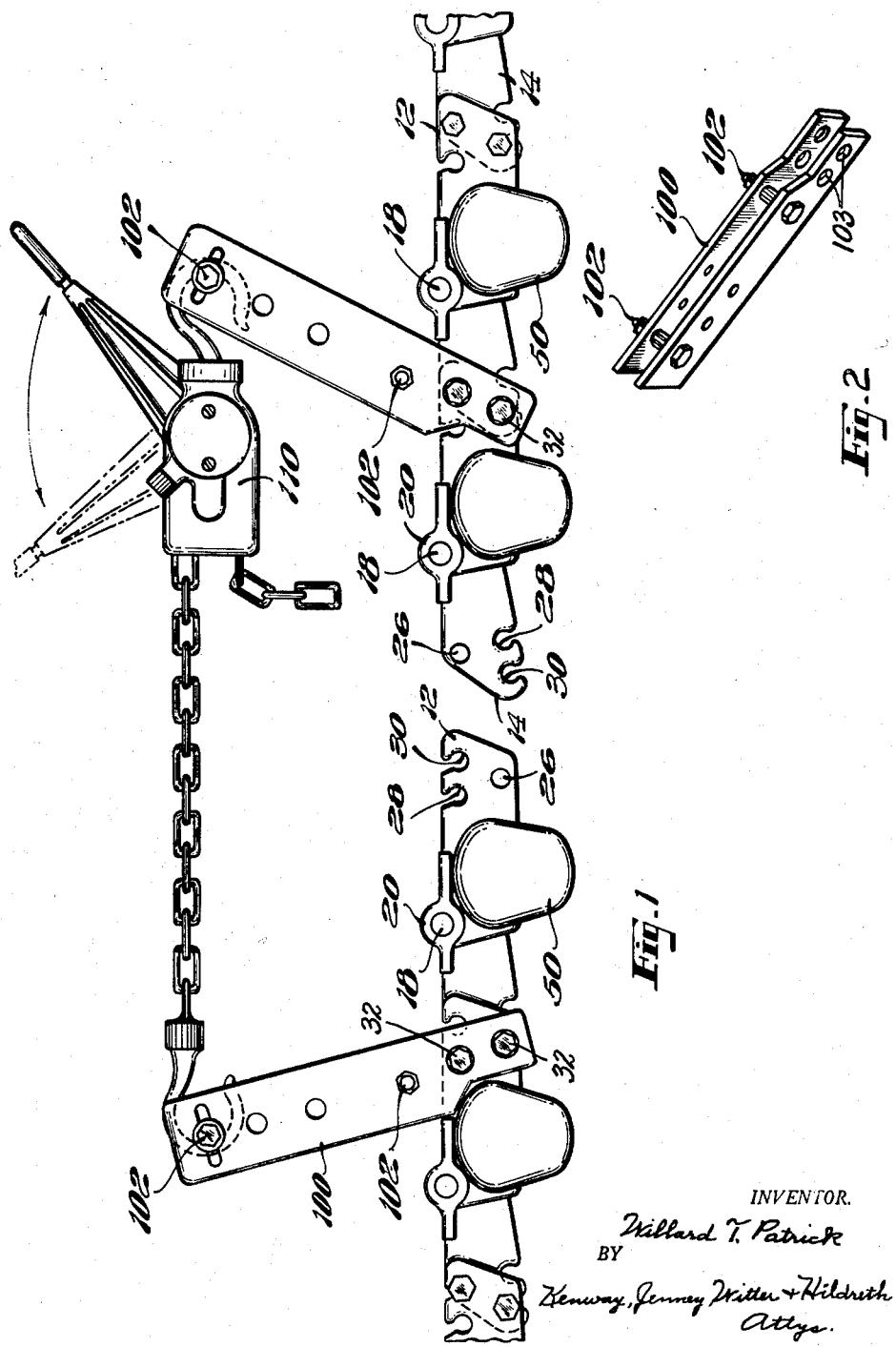

2,936,157
TENSIONING TOOL FOR CRAWLER TRACK APPARATUS

Willard T. Patrick, Great Neck, N.Y., assignor of one-half to George Reinhardt, New York, N.Y.

Original application May 18, 1955, Serial No. 509,132. Divided and this application August 6, 1956, Serial No. 602,370

1 Claim. (Cl. 254—81)

This invention pertains to traction equipment for vehicles of various sorts, particularly trucks, cranes and earth moving equipment.

In the past it has been customary to use both tired vehicles as well as vehicles equipped with endless tank type treads in earth moving work, construction projects and the like. There has, however, been a persistent demand for apparatus by means of which a tired vehicle could be equipped temporarily with endless tank type tracks and thus enabled to operate on terrain not suitable for tired vehicles. Although crawler tracks arranged for temporary mounting on trucks and the like have been constructed in the past and were, indeed, used widely upon military vehicles during the last war, the prior devices proved unsuitable for civilian industrial use not only because of serious difficulties involved in installation, but primarily because the useful life of the equipment was no greater than a few weeks under most favorable circumstances.

The most important object of my invention is to provide equipment by means of which either single-tired or double tired wheeled vehicles can rapidly and economically be equipped with crawler tracks and operated for protracted periods of time without the necessity for repair or replacement.

Another important object of the invention is to provide means by which a crawler track may rapidly and easily be installed on tired vehicles.

An important feature of the invention comprises novel tightening apparatus arranged to engage selected links and provide means by which a track can be wrapped tightly about the tires of a vehicle and easily secured in position on a vehicle.

This application is a division of my copending application Ser. No. 509,132 filed May 18, 1955, entitled Crawler Track Apparatus, now abandoned.

These and other objects and features of the invention will be more readily understood and appreciated from the following detailed description of a preferred embodiment thereof selected for purposes of illustration and shown in the accompanying drawing in which:

Fig. 1 is a view in side elevation illustrating diagrammatically the arrangement for joining the free ends of a track, and Fig. 2 is a view in perspective of a special tool devised for use in installing a crawler track on a vehicle.

In Fig. 1 there is illustrated a crawler track such as would be suitable for my invention, particularly showing the arrangement of how the free ends may be drawn together. The track is generally composed of a series of flexible links, each composed of a pair of link plates 12 pivotally connected by a stub shaft 18 to another pair of plates 14. A pillow block bearing 20 receives the ends of the stub shaft 18 and may be fitted with a shoe if desired.

A streamlined shield or guide member 50 houses a portion of each link and will bear against the side walls of the tire on installation. Bolt receiving holes 26 and slots 28 and 30 are triangularly arranged at the extremities of the plates 12 and 14 so that the links may be joined together in end-to-end relation. In the embodiment shown in Fig. 1, the effective track length may be varied depending on whether slot 28 or slot 30 is aligned with hole 26 and a bolt passed through.

Two bolts are used for this connection, the heads and nuts of which form protuberances on both sides of the plates as indicated by the reference character 32 in Fig. 1.

Coming now to the installation of a crawler track, I should like to point out that the first step is to lay out the track on the ground in a straight line, the track resting on the shoes with the link plates and guide members extending upwardly. The vehicle to be equipped with the track is then maneuvered so that, in the case of a vehicle having rear wheels with double tires, the crevice or space between the tires of the rear wheels is aligned with the guide members. It will be understood that, if the vehicle happens to be of the type having rear wheels with single tires, thus requiring crawler tracks with double guides, then the vehicle should be maneuvered so that the tires are between the two chains of link plates or guide members. The vehicle is moved upon the track until only a few feet are left extending rearwardly of the rearmost wheels. The length of track left upon the ground should be sufficient to permit it to be applied to the periphery of the tire and to reach a point on the periphery which is at a height above the ground approximately equal to that of the hub or axle of the wheels. The other end of the track is then looped over the wheels so that the free end comes to rest on the periphery of the tire at a height above the ground slightly greater than that of the hub or axle of the rearmost pair of wheels. It then remains to bring the two ends together and join the opposite link plates, the arrangement of the link plates being such that it will be a matter of inserting two contiguous inner link plates into the embrace of a pair of outer spaced link plates 12. If the installation is to be optimum, the track must be tensioned as tightly as possible to prevent slippage of the track with respect to the tires. In the past various arrangements of bars and winches have been employed without too much success. In Figs. 1 and 2, however, I have shown a device by means of which satisfactorily tight installations may be rapidly and easily achieved. I first remove one or two shoes from each end of the track. This provides access to the bolts connecting the free end links with the penultimate link at each end.

In Fig. 2 I have shown the means employed to grip the ends of the track and bring them together under tension into a position in which they may be secured together. The tool for this purpose comprises a pair of spaced steel plates or beams 100 of identical configuration bolted together in spaced relation by means of bolts and spacing sleeves shown at 102 and provided with reduced end portions each of which has a pair of holes or receptacles 103 sufficiently large to encompass the bolt heads or nuts used to join adjacent links. In Fig. 1 there is illustrated the manner in which the tool is used. The bolts and spacers 102 are first removed and the plates 100 then slipped over the bolts and nuts connecting the ultimate and penultimate links at each end of the track to be installed. Then the bolts and spacers 102 are employed to clamp one tool in place at each end of the track. It will be seen that the tools 100 could not be employed in this fashion if the shoes were not removed from the two end links at each end of the track, since there would otherwise not be sufficient space for the insertion of the tools. After the tools 100 have thus been mounted at each end of the track, they are spanned by a small chain falls, block and tackle, or other tensioning device, the device appearing in Fig. 1 at 110 being of the character usually known as a "come along." The chain falls are then operated to wrap the track tightly about the tires of the vehicle and to bring together the free ends. The holes 26 in the opposed pairs of link plates are always utilized, but the dimensions of the track and the tires determine whether the slot 28 or the slot 30 will be employed, depending upon whether a short coupling or a long coupling is desired.

If it be found when the track is thus tensioned and the ends brought together that there is too much or too little slack, it is then necessary to release the ends and reconnect one or more pairs of links in the track by changing either from a short coupling to a long, if the track is too short, or from a long coupling to a short coupling, if the track is too long. There is thus provided ample scope for adjusting to various conditions. In any case, when the final connections have been made, the tools 100 are removed, and the shoes are mounted in position. The crawler track is then ready for use.

Having now described and illustrated a preferred embodiment of the invention, what I claim as new and desire to secure by Letters Patent of the United States is:

An apparatus for drawing together the free ends of a crawler track having a plurality of links each of which is formed with at least two spaced protuberances on each side extending in a direction generally perpendicular to the general direction of track length, said apparatus including a pair of tools, each of said tools comprising in combination two spaced, separable, and parallel, flat beams each formed with at least two spaced circular openings adjacent an end, at least two bolts for drawing said beams toward each other, and sleeves surrounding said bolts for holding said beams in fixed and spaced relation, with said protuberances received in said openings; said apparatus further including a chain falls engageable with said sleeves to draw said tools and said free ends of the crawler track together.

References Cited in the file of this patent

UNITED STATES PATENTS

| | | |
|---|---|---|
| 2,098,805 | Huntington | Nov. 9, 1937 |
| 2,114,901 | Henderson | Apr. 19, 1938 |
| 2,332,607 | Schroeder et al. | Oct. 26, 1943 |
| 2,340,409 | Benjamin | Feb. 1, 1944 |